(12) United States Patent
Fitzgibbon (10) Patent No.: US 8,643,465 B2
(45) Date of Patent: Feb. 4, 2014

(54) NETWORK ID ACTIVATED TRANSMITTER

(75) Inventor: James J. Fitzgibbon, Batavia, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 1162 days.

(21) Appl. No.: 11/566,529

(22) Filed: Dec. 4, 2006

(65) Prior Publication Data

US 2008/0130791 A1 Jun. 5, 2008

(51) Int. Cl.
*G05B 19/00* (2006.01)
(52) U.S. Cl.
USPC .......... 340/5.64; 340/5.71; 340/5.2; 340/5.61
(58) Field of Classification Search
USPC ......... 340/5.1, 5.2, 5.21, 5.33, 5.64, 5.7, 5.71
See application file for complete search history.

(56) References Cited

U.S. PATENT DOCUMENTS

| | | | |
|---|---|---|---|
| 2,980,827 A | 4/1961 | Hill | |
| 3,536,836 A | 10/1970 | Pfeiffer | |
| 4,325,146 A * | 4/1982 | Lennington | 398/108 |
| 4,573,046 A | 2/1986 | Pinnow | |
| 4,987,402 A | 1/1991 | Nykerk | |
| 5,003,293 A | 3/1991 | Wu | |
| 5,247,440 A | 9/1993 | Capurka | |
| 5,255,341 A | 10/1993 | Nakajima | |
| 5,278,832 A | 1/1994 | Binzel et al. | |
| 5,280,527 A | 1/1994 | Gullman | |
| 5,283,549 A | 2/1994 | Mehaffey | |
| 5,473,318 A * | 12/1995 | Martel | 340/5.23 |
| 5,475,377 A * | 12/1995 | Lee | 340/5.9 |
| 5,541,585 A * | 7/1996 | Duhame et al. | 340/5.62 |
| 5,565,857 A * | 10/1996 | Lee | 340/5.42 |
| 5,805,082 A * | 9/1998 | Hassett | 340/928 |
| 5,886,634 A * | 3/1999 | Muhme | 340/572.1 |
| 5,940,000 A * | 8/1999 | Dykema | 340/4.31 |
| 5,990,828 A | 11/1999 | King | |

(Continued)

FOREIGN PATENT DOCUMENTS

| | | |
|---|---|---|
| DE | 19801119 C1 | 9/1999 |
| EP | 0913979 A2 | 5/1999 |

(Continued)

OTHER PUBLICATIONS

British Combined Search and Examination Report Under Section 17 and 18(3) from British Application No. GB0713690.6 Dated Oct. 17, 2007.

(Continued)

*Primary Examiner* — Jennifer Mehmood
*Assistant Examiner* — Rufus Point
(74) *Attorney, Agent, or Firm* — Fitch, Even, Tabin & Flannery LLP (57) ABSTRACT

A security code transmitter is provided to transmit a control signal to a barrier movement operator to controlling movement of a movable barrier. The barrier movement operator is proximate to a wireless communication network having a network ID. A receiver of the security code transmitter receives a transmitted network signal comprising the network ID from the wireless communication network. A memory of the security code transmitter stores a predetermined ID. A processor of the security code transmitter determines whether the wireless network ID of the transmitted network signal matches the predetermined wireless network ID. When a match is determined, the security code transmitter is controlled to transmit the control signal to the barrier movement operator.

20 Claims, 5 Drawing Sheets

(56) References Cited

U.S. PATENT DOCUMENTS

| | | | |
|---|---|---|---|
| 6,002,332 A | 12/1999 | King | |
| 6,026,165 A * | 2/2000 | Marino et al. | 380/273 |
| 6,154,544 A | 11/2000 | Farris | |
| 6,161,005 A | 12/2000 | Pinzon | |
| 6,271,765 B1 | 8/2001 | King et al. | |
| 6,356,868 B1 | 3/2002 | Yuschik | |
| 6,388,559 B1 | 5/2002 | Cohen | |
| 6,404,337 B1 | 6/2002 | Van | |
| 6,427,913 B1 | 8/2002 | Maloney | |
| 6,434,158 B1 * | 8/2002 | Harris et al. | 370/401 |
| 6,434,408 B1 | 8/2002 | Heckel | |
| 6,448,894 B1 | 9/2002 | Desai | |
| 6,476,708 B1 | 11/2002 | Johnson | |
| 6,476,732 B1 | 11/2002 | Stephan | |
| 6,616,034 B2 | 9/2003 | Wu et al. | |
| 6,717,528 B1 * | 4/2004 | Burleson et al. | 340/9.1 |
| 6,792,083 B2 | 9/2004 | Dams | |
| 6,803,851 B1 * | 10/2004 | Kramer et al. | 340/5.61 |
| 6,803,882 B2 | 10/2004 | Hoetzel | |
| 6,822,603 B1 * | 11/2004 | Crimmins et al. | 341/176 |
| 6,919,790 B2 * | 7/2005 | Kanazawa | 340/5.21 |
| 6,960,998 B2 * | 11/2005 | Menard et al. | 340/539.19 |
| 6,975,202 B1 * | 12/2005 | Rodriguez et al. | 340/5.25 |
| 6,998,977 B2 * | 2/2006 | Gregori et al. | 340/505 |
| 7,038,409 B1 * | 5/2006 | Mullet | 318/280 |
| 7,071,813 B2 | 7/2006 | Fitzgibbon | |
| 7,071,850 B1 | 7/2006 | Fitzgibbon | |
| 7,124,943 B2 | 10/2006 | Quan et al. | |
| 7,142,849 B2 * | 11/2006 | Neuman | 455/420 |
| 7,158,007 B2 * | 1/2007 | Kawamoto | 340/5.64 |
| 7,167,076 B2 * | 1/2007 | Wilson | 340/5.61 |
| 7,170,998 B2 * | 1/2007 | McLintock et al. | 380/277 |
| 7,176,076 B2 | 2/2007 | Wilson | |
| 7,190,266 B2 * | 3/2007 | Mullet et al. | 340/540 |
| 7,227,444 B2 * | 6/2007 | Fitzgibbon | 340/5.24 |
| 7,262,683 B2 * | 8/2007 | Maeda | 340/5.31 |
| 7,266,344 B2 * | 9/2007 | Rodriguez | 455/41.3 |
| 7,289,014 B2 * | 10/2007 | Mullet et al. | 340/5.7 |
| 7,298,240 B2 * | 11/2007 | Lamar | 340/5.6 |
| 7,306,145 B2 * | 12/2007 | Sakai | 235/382 |
| 7,323,991 B1 * | 1/2008 | Eckert et al. | 340/572.1 |
| 7,365,634 B2 * | 4/2008 | Brookbank | 340/5.7 |
| 7,392,944 B2 * | 7/2008 | Shieh | 235/382.5 |
| 7,424,733 B2 * | 9/2008 | Kamiwada et al. | 726/4 |
| 7,446,644 B2 * | 11/2008 | Schaffzin et al. | 340/5.6 |
| 7,468,676 B2 * | 12/2008 | Styers et al. | 340/686.1 |
| 7,498,936 B2 * | 3/2009 | Maeng | 340/539.1 |
| 7,616,090 B2 * | 11/2009 | Baker et al. | 340/5.22 |
| 7,724,687 B2 * | 5/2010 | Autret et al. | 370/255 |
| 7,853,221 B2 * | 12/2010 | Rodriguez et al. | 455/74 |
| 7,856,558 B2 * | 12/2010 | Martin et al. | 713/186 |
| 8,014,528 B2 * | 9/2011 | Bunte et al. | 380/278 |
| 2002/0178385 A1 | 11/2002 | Dent et al. | 713/202 |
| 2002/0180582 A1 * | 12/2002 | Nielsen | 340/5.6 |
| 2003/0016119 A1 * | 1/2003 | Teich | 340/5.22 |
| 2003/0016139 A1 * | 1/2003 | Teich | 340/825.22 |
| 2003/0018478 A1 | 1/2003 | Mays | |
| 2003/0023881 A1 | 1/2003 | Fitzgibbon | |
| 2003/0029579 A1 | 2/2003 | Mays | |
| 2003/0043021 A1 * | 3/2003 | Chung | 340/5.71 |
| 2003/0097586 A1 * | 5/2003 | Mok | 713/200 |
| 2003/0118187 A1 * | 6/2003 | Fitzgibbon | 380/270 |
| 2003/0182132 A1 | 9/2003 | Niemoeller | |
| 2003/0193388 A1 | 10/2003 | Ghabra | |
| 2003/0216139 A1 | 11/2003 | Olson | |
| 2003/0222754 A1 | 12/2003 | Cho | |
| 2004/0012481 A1 * | 1/2004 | Brusseaux | 340/5.7 |
| 2004/0012483 A1 | 1/2004 | Mays | |
| 2004/0036573 A1 * | 2/2004 | Fitzgibbon et al. | 340/5.64 |
| 2004/0239482 A1 | 12/2004 | Fitzgibbon | |
| 2004/0257199 A1 | 12/2004 | Fitzgibbon | |
| 2005/0030179 A1 * | 2/2005 | Script et al. | 340/545.1 |
| 2005/0035873 A1 * | 2/2005 | Kimura | 340/825.72 |
| 2005/0044906 A1 * | 3/2005 | Spielman | 70/63 |
| 2005/0085248 A1 * | 4/2005 | Ballay et al. | 455/500 |
| 2005/0088281 A1 * | 4/2005 | Rohrberg et al. | 340/5.71 |
| 2005/0099299 A1 * | 5/2005 | Tyroler et al. | 340/572.1 |
| 2005/0110639 A1 * | 5/2005 | Puzio et al. | 340/572.1 |
| 2005/0146417 A1 * | 7/2005 | Sweatte | 340/5.2 |
| 2005/0170777 A1 * | 8/2005 | Harwood et al. | 455/41.2 |
| 2005/0242923 A1 * | 11/2005 | Pearson et al. | 340/5.62 |
| 2005/0245233 A1 * | 11/2005 | Anderson | 455/411 |
| 2005/0258937 A1 * | 11/2005 | Neuwirth | 340/5.92 |
| 2006/0038656 A1 | 2/2006 | Wilson | |
| 2006/0056663 A1 * | 3/2006 | Call | 382/115 |
| 2006/0091998 A1 | 5/2006 | Fitzgibbon | |
| 2006/0103503 A1 * | 5/2006 | Rodriguez | 340/5.71 |
| 2006/0132284 A1 * | 6/2006 | Murphy et al. | 340/5.7 |
| 2006/0145811 A1 | 7/2006 | Nantz | |
| 2006/0147052 A1 | 7/2006 | Wikel | |
| 2006/0153122 A1 * | 7/2006 | Hinman et al. | 370/328 |
| 2006/0164208 A1 | 7/2006 | Schaffzin | |
| 2006/0187034 A1 * | 8/2006 | Styers et al. | 340/545.1 |
| 2006/0214783 A1 | 9/2006 | Ratnaker | |
| 2006/0220785 A1 * | 10/2006 | Ferdman | 340/5.61 |
| 2007/0005806 A1 | 1/2007 | Fitzgibbon | |
| 2007/0046428 A1 | 3/2007 | Mamaloukas et al. | |
| 2007/0058811 A1 | 3/2007 | Fitzgibbon | |
| 2007/0116194 A1 | 5/2007 | Agapi | |
| 2007/0159301 A1 * | 7/2007 | Hirt et al. | 340/10.1 |
| 2007/0290792 A1 | 12/2007 | Tsuchimochi | |
| 2008/0061926 A1 * | 3/2008 | Strait | 340/5.22 |
| 2008/0092443 A1 | 4/2008 | Herman | |
| 2008/0106370 A1 | 5/2008 | Perez | |
| 2008/0130791 A1 | 6/2008 | Fitzgibbon | |
| 2008/0132220 A1 | 6/2008 | Fitzgibbon | |
| 2009/0005080 A1 | 1/2009 | Forstall | |
| 2009/0063293 A1 | 3/2009 | Mirrashidi | |
| 2009/0064056 A1 | 3/2009 | Anderson | |
| 2009/0273438 A1 | 11/2009 | Sultan | |
| 2009/0315751 A1 | 12/2009 | Bennie | |
| 2010/0120450 A1 | 5/2010 | Herz | |
| 2010/0242369 A1 | 9/2010 | Laird | |
| 2011/0205013 A1 | 8/2011 | Karasek | |
| 2011/0258076 A1 | 10/2011 | Muirbrook | |
| 2011/0316667 A1 * | 12/2011 | Tran | 340/5.61 |
| 2012/0188054 A1 | 7/2012 | Bongard | |

FOREIGN PATENT DOCUMENTS

| | | |
|---|---|---|
| GB | 2 404 765 | 2/2005 |
| WO | 9515663 A1 | 6/1995 |
| WO | 9923614 | 5/1999 |

OTHER PUBLICATIONS

Deposition Upon Oral Examination, vol. I; US District Court—Western District of Washington at Tacoma; Case No. C09-5438 BHS; Jul. 7, 2010.

Motion in Limine—Oral Argument Requested; US District Court—Western District of Washington at Tacoma; Case No. C09-5438 BHS; Oct. 21, 2010.

Defendant's Opposition to Plaintiff's Motion in Limine; US District Court—Western District of Washington at Tacoma; Case No. C09-5438 BHS; Nov. 23, 2010.

Jan. 7, 2011 Opposition to Chamberlain's Motion to Exclude Evidence of Chamberlain's Use of IEI Intellectual Property; US District Court—Western District of Washington at Tacoma; Case No. C09-5438 BHS.

Plaintiff's Supplemental Brief Regarding Chamberlain's Patent Applications; US District Court—Western District of Washington at Tacoma; Case No. C09-5438 BHS; Jul. 7, 2011.

Transcript of Proceedings Before the Honorable Benjamin H. Settle United States District Judge; US District Court—Western District of Washington at Tacoma; Case No. C09-5438 BHS; Dec. 15, 2010.

Plaintiff's Motion in Limine; US District Court—Western District of Washington at Tacoma; Case No. C09-5438 BHS; Nov. 15, 2010.

Plaintiff's Brief in Opposition to Defendant's Motion in Limine; US District Court—Western District of Washington at Tacoma; Case No. C09-5438 BHS; Nov. 1, 2010.

Declaration in Support of Response to Motion in Limine; US District Court—Western District of Washington at Tacoma; Case No. C09-5438 BHS; Nov. 1, 2010.

(56) References Cited

OTHER PUBLICATIONS

Declaration in Support of Motion in Limine; US District Court—Western District of Washington at Tacoma; Case No. C09-5438 BHS; Oct. 21, 2010.
British Search Report Under Section 17; Dated: Oct. 17, 2007 for Application No. GB0713690.6.
European Patent Application No. EP 1 280 109 A3; European Search Report Dated: Aug. 1, 2005.
James Y. Wilson and Jason A. Kronz; Inside Bluetooth Part II, Dr. Dobb's Portal; The World of Software Development; Dr.Dobb's Journal; Jul. 22, 2001; 9 pages.
Sensory, Inc. RSC-300/364 Data Book, Jan. 2001 (55 pages).

* cited by examiner

NETWORK ID ACTIVATED TRANSMITTER

TECHNICAL FIELD

This invention relates generally to security code transmitters for barrier movement operators and particularly to security code transmitters for use with barrier movement operators in proximity to wireless communication networks having network identifiers ("IDs").

BACKGROUND

Many homeowners and/or renters park vehicles in garages. In many of these garages, the homeowners can gain entrance to the garage by pressing a button on a garage door opener. To do so, the homeowners often must grab the garage door opener to press the button. Sometimes, however, the garage door opener is not readily accessible and the homeowner must temporarily stop movement of the vehicle and look for the garage door opener. Moreover, the driver must divert his or her attention to grab the garage door opener and press the button. To do so, the driver has to take at least one hand off the steering wheel and redirect his or her attention.

There are some garage door systems in the art that include a transmitter attached to the garage door operator that periodically transmits a beacon signal. The beacon signal includes a unique code or identifier and is received by nearby garage door opener portable transmitters. In the event that the unique code corresponds to a code that has been pre-stored in a memory of the garage door opener portable transmitter, the garage door opener portable transmitter performs an action such as transmitting a control signal to the garage door operator to command the garage door operator to open a garage door. Other systems enable the garage door opener upon detection of the beacon signal so that the user can subsequently press a button to cause the garage door opener to send the control signal to the garage door operator.

Such beacon systems, however, can be expensive and require periodic maintenance. Older operators may not have the beacon generator and will therefore not operate with the automatic portable transmitter. Because such beacon transmitters periodically broadcast the beacon signal, power is wasted when the beacon broadcasts the signal but no garage door openers are nearby to receive the beacon signal.

Moreover, such beacon transmitters broadcast within a spectrum controlled by the Federal Communications Commission ("FCC"). In the event that the FCC decides to allocate the spectrum utilized by the beacon transmitter to the military or some other entity, for example, the beacon transmitter would have to be reconfigured to transmit at a different frequency. The beacon transmitters also sometimes encounter signal interference because other beacon transmitters nearby can transmit at the same signal frequency.

SUMMARY OF THE INVENTION

Many current home wireless computer networks have a built-in network ID. The network ID allows a computer to detect the wireless network and automatically connect to it. The wireless network ID is often broadcast within a house and to an area outside of the house. This wireless network ID can be detected by an electronic device external to the house provided it is within a certain distance from the house.

An embodiment of the present invention is directed to a security code transmitter to transmit a control signal to a barrier movement operator to control the movement of a movable barrier. The barrier movement operator is proximate to a wireless communication network. A receiver of the transmitter is adapted to receive a transmitted network signal from the wireless communication network such as a home Wi-Fi computer network, Bluetooth network, alarm network, or a home automation network. The network signal has a wireless network ID. A memory of the transmitter stores a predetermined ID. A processor of the portable transmitter determines whether the wireless network ID of the received network signal matches the predetermined ID. The portable transmitter is controlled to transmit a control signal to the barrier movement operator in response to a successful match.

An embodiment of the present invention is directed to a system for controlling movement of a movable barrier. A wireless communication network broadcasts a wireless network ID. A barrier movement operator is located proximate to the wireless communication network, and is adapted to move the movable barrier and perform additional movable barrier functions. A portable security code transmitter detect the wireless network ID, compares the wireless network ID with predetermined IDs stored in a memory of the security code transmitter, and transmit a control signal to the barrier movement operator for controlling the movement of the movable barrier in response to a match of the wireless network ID and the predetermined ID.

An embodiment of the present invention is directed to a method for commanding a barrier movement operator located proximate to a wireless communication network to control movement of a movable barrier and perform additional movable barrier functions. The wireless communication network may comprise a home Wi-Fi computer network, Bluetooth network, an alarm network, or a home automation network. A transmitted network signal having a wireless network ID is detected from the wireless communication network by a user-held security code transmitter. A determination is made regarding whether a predetermined ID stored in a memory matches the wireless network ID of the transmitted signal. A control signal is transmitted to the barrier movement operator in response to a successful match of the predetermined wireless network ID and the wireless network ID.

An embodiment of the invention is directed to a method of programming a security code transmitter for transmitting a control signal to a barrier movement operator to control the movement of a movable barrier. The barrier movement operator is proximate to a wireless communication network having a network ID. The method includes initiating a learning mode in response to a user input. A transmitted network signal comprising the network ID is received from the wireless communication network. Finally, the wireless network ID is stored in a memory of the security code transmitter. The user may provide a second user input to associate a particular network ID with a movable barrier function to be performed, such as opening the movable barrier.

In some embodiments, a minimum received signal strength of the wireless network signal is required so that that the security code transmitter is not erroneously enabled when it is relatively far from the barrier movement operator. By detecting the wireless network ID of the wireless network of a house adjacent to the barrier movement operator, a user is provided a simple way of causing the barrier movement operator to perform a movable barrier function such as opening the movable barrier. Such automatic detection of an existing household wireless network permits the user to drive the user's vehicle without having to reach for a transmitter to transmit a control signal to the barrier movement operator. The embodiments described herein may be utilized in conjunction with various types of wireless networks already in existence or that may be developed in the future. The incremental cost of detecting a unique ID of a wireless network is minimal because the wireless network is one that already exists and is currently in use.

The above summary of the present invention is not intended to represent each embodiment or every aspect of the present invention. The detailed description and Figures will describe many of the embodiments and aspects of the present invention.

BRIEF DESCRIPTION OF THE DRAWINGS

The above needs are at least partially met through provision of the method and apparatus for remote control described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, a security code transmitter is provided that detects a pre-existing wireless network such as a home Wi-Fi computer network, Bluetooth network, an alarm network, a home automation network, or any other type of household wireless network. The wireless network has a wireless network identifier ("ID") that it periodically broadcasts throughout the wireless network either automatically or in response to a query. The security code transmitter compares the detected wireless network ID with a pre-stored ID in a memory of the security code transmitter. If the IDs match, the security code transmitter is enabled to perform a function such as transmitting a control signal to a barrier movement operator. The barrier movement operator may be a garage door operator. Alternatively, when the IDs match, a state of the security code transmitter is enabled so that the user can press a button on the security code transmitter or enter a code to cause security code transmitter to transmit the control signal to the barrier movement operator. The garage door operator may be located adjacent to a structure, such as a house, utilizing the wireless network.

Many home wireless computer networks currently in use have a built-in identification ("ID"). This ID allows a computer to detect the wireless network and automatically connect to it. The computer often has a list of network IDs, such as service set identifiers ("SSID") for Institute of Electrical and Electronics Engineers ("IEEE") 802.11. When the computer is portable it may have a network ID for work, a different network ID for home, and an additional network ID for another place, such as a local coffee shop.

The computer automatically detects which network is within range, based on the received wireless network ID. This detection allows the computer to connect to the local network without having the person notify the computer of its location. The computer effectively detects whether it is near work, home, or the local coffee shop without user input. The wireless network ID is often broadcast within a structure such as a house or other building and to an area outside of the structure. This wireless network ID can be detected by an electronic device external to the structure provided it is within a certain distance from the house.

The security code transmitter described below detects the pre-existing wireless network. The security code transmitter includes a receiver to receive a signal from the wireless network that has the wireless network ID. The security code transmitter maintains a list of one or more IDs in a memory and in the event that the wireless network ID matches an ID stored in the memory, the security code transmitter may transmit a control signal to the security code transmitter to cause the security code transmitter to, for example, open the garage door. Alternatively, upon a successful match of the wireless network ID to an ID stored in the memory, a user input device of the security code transmitter is enabled so that the user can press a button or enter a code to cause the security code transmitter to transmit the control signal to the barrier movement operator.

The relevant IDs stored in the memory of the security code transmitter may be manually programmed by the user. Alternatively, the user may press a series of buttons on the security code transmitter or enter a certain code to cause the security code transmitter to enter a learning mode whereby the security code transmitter automatically learns the relevant wireless network ID and stores it in the memory.

The security code transmitter automatically detects the network ID of the user's home wireless computer network, or some other type of home network, such as a home automation network that transmits a different unique ID. By utilizing existing wireless networks, instead of installing a beacon transmitter within the garage as is done in current systems, the methods described herein can easily be achieved with marginal incremental costs to the user.

As discussed above, the user's security code transmitter may be pre-programmed to automatically transmit a control signal to the garage door operator upon detection of the wireless network ID. For example, the security code transmitter may be configured to automatically transmit a signal to the garage door operator to cause the garage door operator to open the garage door. In such case, the security code transmitter may be configured to transmit the signal only when the received signal strength of the signal from the wireless network exceeds a predetermined threshold. The reason for this threshold is so that, for example, the security code transmitter does not inadvertently transmit a control signal to the garage door operator when the user is driving on the street past the structure to which the garage door operator is affixed, when the user has no intention of causing the garage door operator to open the garage door.

The security code transmitter may include one or more function buttons to cause the security code transmitter to implement various functions upon detecting the wireless network ID. For example, the user may utilize the button to instruct the garage door operator of the function to be performed upon detection of the wireless network's ID. For example, the user may program the security code transmitter to cause the security code transmitter to send a control signal to cause the garage door operator to open the garage door and/or turn on the garage door light. The user may also depress a button to shut off the security code transmitter so the security code transmitter is not periodically checking for the wireless network's ID.

The user may further program the security code transmitter to operate with more than one garage door operator. For example, in the event that the user owns or uses more than one residence or place of work having a garage door operator or some other movable barrier operator, the user may program the security code transmitter to detect wireless network IDs for the residence and the place of work in response to detecting each respective wireless network ID.

Figure 1:
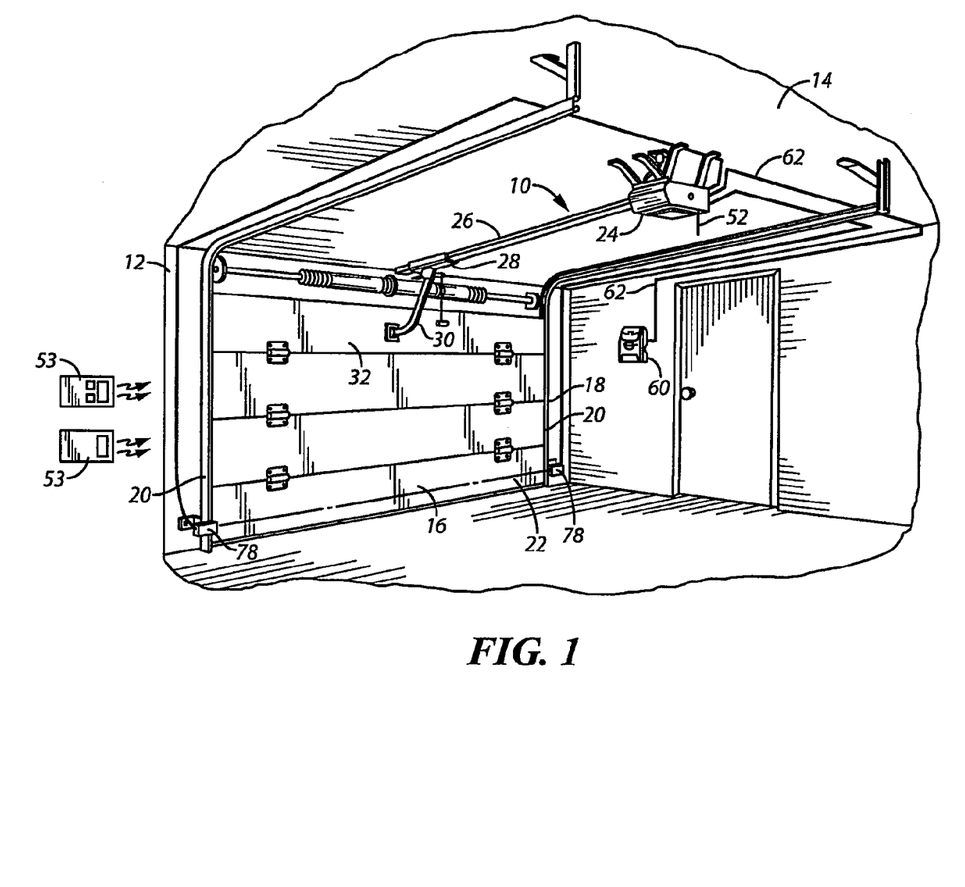
FIG. 1 is a perspective view of a garage including a barrier movement operator, specifically a garage door operator, having associated with it a passive infrared detector in a wall control unit and embodying the present invention.

Referring now to drawings and especially to FIG. 1, a barrier movement operator embodying the present invention is shown therein and generally identified by reference numeral 10. The barrier movement operator, in this embodiment a garage door operator 10, is positioned within a garage 12. More specifically, it is mounted to a ceiling 14 of the garage 12 for operation, in this embodiment, of a multipanel garage door 16. The multipanel garage door 16 includes a plurality of rollers 18 rotatably confined within a pair of tracks 20 positioned adjacent to and on opposite sides of an opening 22 for the garage door 16.

The garage door operator 10 also includes a head unit 24 for providing motion to the garage door 16 via a rail assembly 26. The rail assembly 26 includes a trolley 28 for releasable connection of the head unit 24 to the garage door 16 via an arm 30. The arm 30 is connected to an upper portion 32 of the garage door 16 for opening and closing it. The trolley 28 is connected to an endless chain to be driven thereby. The chain is driven by a sprocket in the head unit 24. The sprocket acts as a power takeoff for an electric motor located in the head unit 24.

Figure 2:
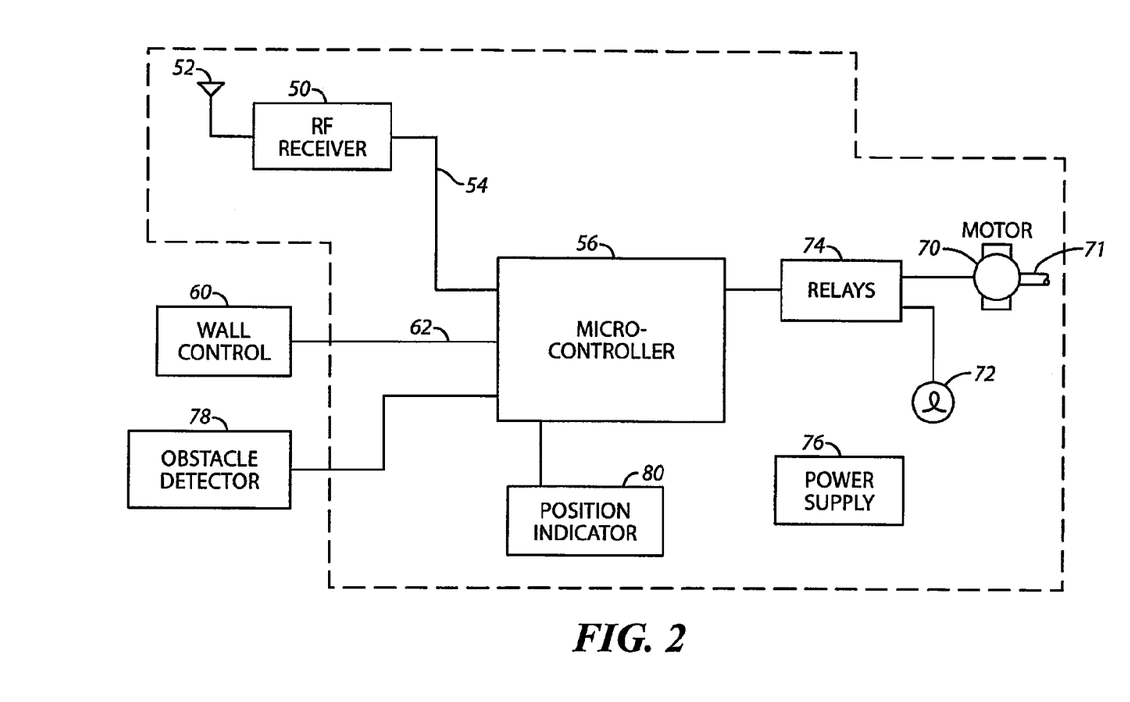
FIG. 2 is a block diagram showing the relationship between major electrical systems of a portion of the garage door operator shown in FIG. 1.

The head unit 24 includes a radio frequency receiver 50, as may best be seen in FIG. 2, having an antenna 52 associated with it for receiving coded radio frequency transmissions from one or more radio transmitters 53 which may include portable or keyfob transmitters or keypad transmitters. The radio receiver 50 is connected via a line 54 to a microcontroller 56 which interprets signals from the radio receiver 50 as code commands to control other portions of the garage door operator 10.

A wall control unit 60 communicates over a line 62 with the head unit microcontroller 56 to effect control of a garage door operator motor 70, and a light 72 via relay logic 74 connected to the microcontroller 56. The entire head unit 24 is powered from a power supply 76. In addition, the garage door operator 10 includes an obstacle detector 78 that optically or via an infrared-pulsed beam detects when the garage door opening 22 is blocked and signals the microcontroller 56 of the blockage. The microcontroller 56 then causes a reversal or opening of the door 16. In addition, a position indicator 80 indicates to the head unit microcontroller 56, through at least part of the travel of the door 16, the door position so that the microcontroller 56 can control the close position and the open position of the door 16 accurately.

Figure 3:
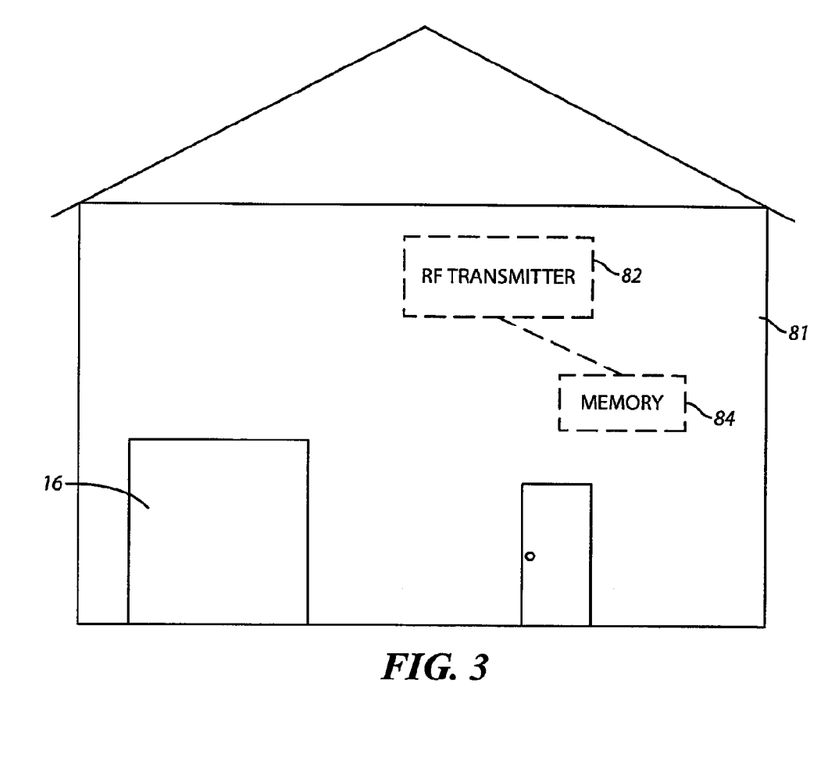
FIG. 3 illustrates a house according to at least one embodiment of the invention.

FIG. 3 illustrates a house 81 according to at least one embodiment of the invention. As shown, the house 81 includes an RF transmitter 82 and a memory 84. The house 81 has its own wireless network with a unique wireless network ID. The RF transmitter 82 periodically broadcasts the wireless network ID. The wireless network ID may be stored in a memory 84 accessible by the RF transmitter 82. The wireless network may be a Wi-Fi network, Bluetooth network, an alarm network, a home automation network, or any other suitable household low range wireless network.

Figure 4:
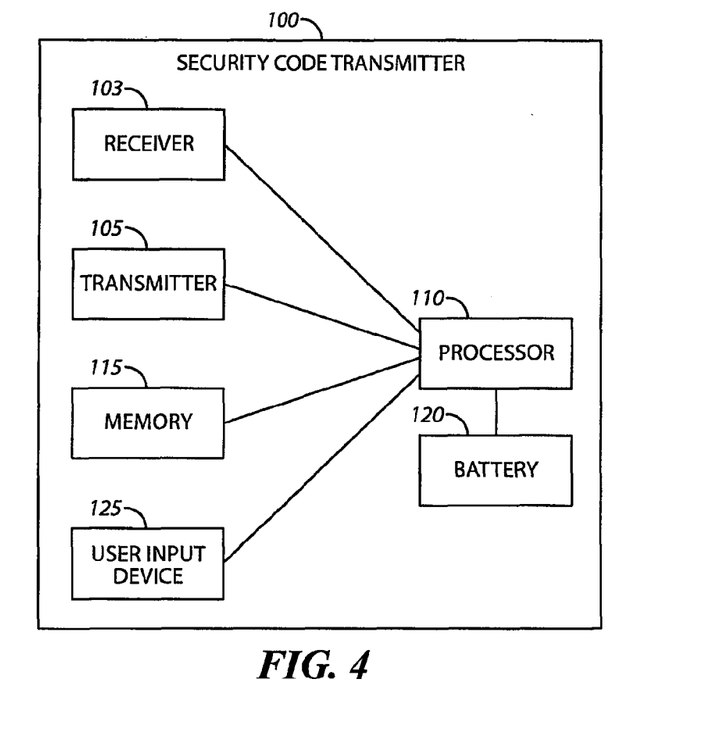
FIG. 4 illustrates a security code transmitter according to at least one embodiment of the invention.

FIG. 4 illustrates a security code transmitter 100 according to at least one embodiment of the invention. The security code transmitter 100 is typically kept within the user's vehicle and is utilized to transmit control signals to the garage door operator 10 to instruct the garage door operator to perform certain garage door operator functions, such as opening the garage door. The security code transmitter 100 may include a receiver 103, a transmitter 105, a processor 110, a memory 115, a battery 120, and a user input device 125.

The receiver 103 detects the wireless network ID transmitted by the RF transmitter 82 within the house 81. The transmitter 105 also transmits control signals to the garage door operator 10 to instruct the garage door operator 10 to perform certain garage door operator functions. The processor 110 controls the various elements within the security code transmitter 100.

The memory 115 is utilized to store at least the wireless network ID and an associated function to be performed in response to detecting the wireless network ID. For example, in the event that a wireless network ID is detected, the processor 110 compares the received wireless network ID with the wireless network ID stored in the memory 115. If the received wireless network ID matches a wireless network ID stored in the memory 115, the processor 110 determines whether a signal is to be transmitted to the garage door operator 10. For example, the memory 115 may contain information indicating that upon detection of a particular wireless network ID, a control signal is to be transmitted to the garage door operator to cause the garage door operator 10 to open the garage door. The instructions regarding the signal, if any, to be sent to the garage door operator 10 may be programmed by the user. The user may program this instruction via a user input device 125 on the security code transmitter 100. The user input device 125 may comprise a button or series of buttons, a keypad, or any other suitable device for receiving an instruction from a user. In other embodiments, the user input device 125 may be external to the security code transmitter 100. For example, the user input device 125 may comprise an external keyboard to interface with the security code transmitter 100 in other embodiments. The security code transmitter 100 may also include a signal strength detector to measure a received signal strength of a detected wireless network signal.

Figure 5:
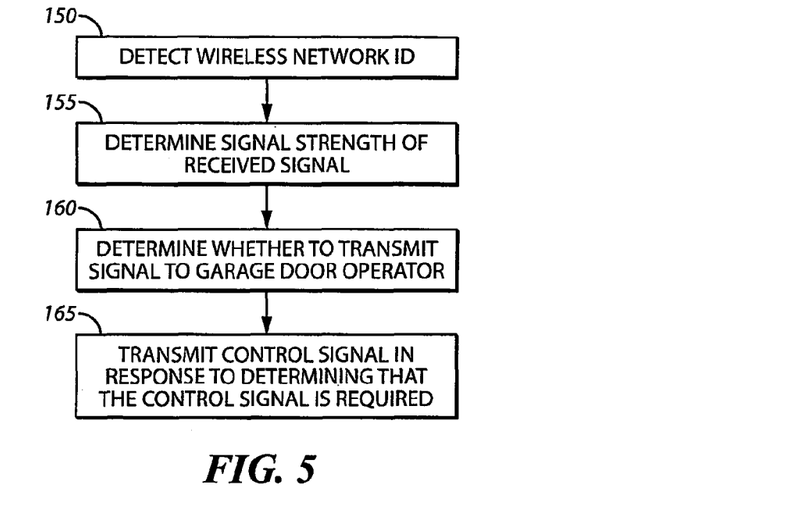
FIG. 5 illustrates a method of operation of the security code transmitter according to at least one embodiment of the invention.

FIG. 5 illustrates a method of operation of the security code transmitter 100 according to at least one embodiment of the invention. First, at operation 150, a wireless network ID is detected by the security code transmitter 100. Next, at operation 155, the security code transmitter 100 determines the signal strength of the received signal from the garage door operator 10. At operation 160, the security code transmitter 100 determines whether to transmit a control signal to the garage door operator 10. The determination is made based on a combination of the received signal strength and a pre-programmed response to perform in response to receiving the wireless network ID. In some embodiments, a minimum threshold received signal strength is required so that the security code transmitter 100 only transmits a control signal to the garage door operator 10 if it is within a minimum threshold distance from the wireless network. By requiring a minimum threshold received signal strength, the security code transmitter 100 is prevented from transmitting a control signal to the garage door operator 10 unless the security code transmitter 100 is close to the garage door operator 10. This ensures that the control signal will not be transmitted to the garage door operator 10 when the user is driving on the street past the house 81 and has no intention of transmitting a control signal to the garage door operator 10. In the event that the garage door operator 10 is located within a garage attached to a house and separated from the street by a driveway that is, for example, 30 feet long, the minimum received signal strength may be set such that the control signal is only transmitted in the event that the security code transmitter 100 is within about 15 feet of the wireless network.

Finally, at operation 165, the control signal is transmitted to the garage door operator 10 in response to determining that the control signal is required. The particular control signal to be transmitted is determined by reference to a function or response stored in the memory 115 and associated with the particular wireless network ID.

The user may program the security code transmitter 100 with a function to be performed upon detection of a particular wireless network ID. The user may utilize the user input device 125 to program the function. The user input device 125 may comprise a button, series of buttons, or keypad on the security code transmitter 100. The memory 115 within the security code transmitter 100 is then updated with the identity of the response to be performed in response to detection of the particular wireless network ID.

Figure 6:
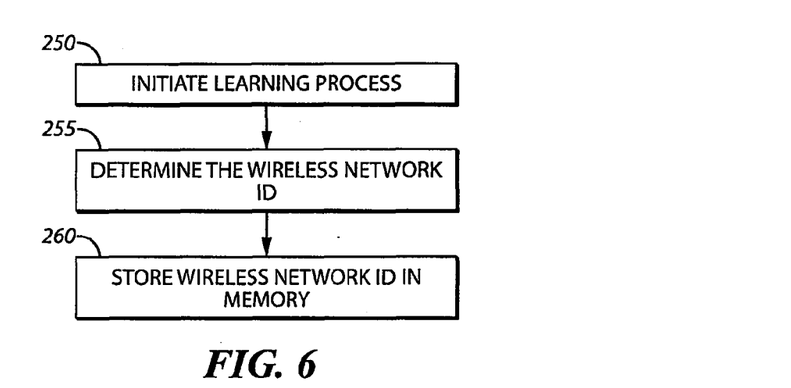
FIG. 6 illustrates a learning process for the security code transmitter learning the wireless network ID according to at least one embodiment of the invention.

FIG. 6 illustrates a learning process for the security code transmitter 100 learning the wireless network ID according to at least one embodiment of the invention. First, at operation 250, the learning process is initiated. The learning process may be initiated by, for example, the user pressing one or more buttons on the user input device 125 of the security code transmitter 100 for a minimum length of time, pressing the buttons of the user input device 125 in a particular order, entering a code via a keypad or some other element of the user input device 125, pressing a button or entering a code on the garage door operator 10 to transmit an instruction signal to the security code transmitter 100, or in any other suitable way. Next, at operation 255, the security code transmitter 100 determines the wireless network ID. This determination may be performed by detecting the wireless network and determining the wireless network ID of the wireless network. Alternatively, the user may manually program the wireless network ID into the security code transmitter 100. In another embodiment, the user may temporarily attach a portable memory to the security code transmitter 100 to allow the security code transmitter to read the wireless network ID from the portable memory. Finally, the wireless network ID is stored in the memory 115 of the security code transmitter 100 at operation 260.

It should be appreciated that there are modifications that may be made to the security code transmitter and its method of communication with the garage door operator. It should also be appreciated that although a garage door operator is discussed in particular embodiments above, in other embodiments a different kind of barrier movement operator may be used, such as a gate operator for opening and closing a gate.

The security code transmitter may include an ON/OFF switch to turn the security code transmitter off such that it is not attempting to detect the wireless network ID all of the time. In such case, the user can manually transmit a control signal to the garage door operator by pressing a button, series of buttons, or code on a keypad to cause the garage door operator to perform a function such as opening or closing the garage door.

The security code transmitter may be programmed to continually detect the wireless network ID. In the event that the security code transmitter no longer detects a signal having the wireless network ID, the security code transmitter determines that the user has driven away from the garage and sends a control signal to close the garage door after a predetermined time interval. In other embodiments, the garage door operator automatically closes the garage door after a predetermined length of time has elapsed after automatically opening the garage door.

The garage door operator is adjacent to a house or other structure having the wireless network that broadcasts a wireless network ID. The security code transmitter automatically detects the wireless network ID. That is, the security code transmitter receives the broadcast of the wireless network ID and determines that it is the user's wireless network. This determination may be based on a comparison of the received wireless network ID with a stored wireless network ID for the wireless network that has previously been stored in a memory of the security code transmitter.

The security code transmitter may be preprogrammed to automatically transmit a control signal to the garage door operator upon detection of the wireless network ID. For example, the security code transmitter may be configured to automatically transmit a signal to the garage door operator to cause the garage door operator to open the garage door. In such case, the security code transmitter may be configured to transmit the signal only when the signal strength of the signal from the garage door operator exceeded a predetermined threshold. The reason for this threshold is so that the security code transmitter does not inadvertently transmit a signal to the garage door operator when the user is driving on the street past a structure to which the garage door operator is affixed, when the user has no intention of causing the garage door operator to open the garage door.

The user may program the security code transmitter to operate with more than one garage door operator. For example, in the event that the user owns or uses more than one residence or place of work having a garage door operator or some other barrier movement operator, the user may program the security code transmitter to detect a wireless network ID for each of the garage door operators and perform a specific function in response to detecting each respective wireless network ID.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A security code transmitter comprising:
a receiver configured to check for and detect a pre-existing local wireless network signal comprising a wireless network ID, the pre-existing local wireless network signal being generated by a stationary device separate from a barrier movement operator; a memory configured to store a predetermined ID;
a transmitter; and
a processor configured to determine whether the wireless network ID of the pre-existing local wireless network signal matches the predetermined ID, and in response to determining a match and without exchange of information with the stationary device other than receipt of the pre-existing local wireless network ID, to control the transmitter to transmit a control signal to a wireless receiver of the barrier movement operator.

2. The security code transmitter of claim 1, further comprising a user input device configured to receive instructions from a user to perform at least one of: associating the wireless network ID with a movable barrier function to be performed, and implementing a learning mode to program the predetermined ID into the memory of the security code transmitter.

3. The security code transmitter of claim 2, wherein the movable barrier function to be performed includes a movable barrier function comprising at least one of: opening the movable barrier, closing the movable barrier, turning on a light in communication with the barrier movement operator, turning off the light in communication with the barrier movement operator, and turning on an electrical load.

4. The security code transmitter of claim 1, wherein the memory stores at least two wireless network IDs.

5. The security code transmitter of claim 1, wherein the receiver is adapted to detect the pre-existing local wireless network signal only in response to a loss of detection of the pre-existing wireless network signal.

6. The security code transmitter of claim 1, further comprising a signal strength detector configured to determine a strength of the pre-existing local wireless network signal, and wherein the processor configured to control the transmitter to transmit the control signal to the barrier movement operator is configured to transmit the control signal to the barrier movement operator in response to determining that the strength of the pre-existing local wireless network signal exceeds a predetermined threshold strength.

7. A system for controlling movement of a movable barrier, the system comprising:
a barrier movement operator adapted to perform movable barrier functions;
a security code transmitter configured to at least periodically check for and detect a pre-existing local wireless network signal comprising a wireless network ID, the pre-existing local wireless network signal being generated by a stationary device separate from the barrier movement operator, compare the wireless network ID with a predetermined ID stored in a memory of the security code transmitter, and transmit a control signal to a wireless receiver of the barrier movement operator for controlling the functions of the movable barrier in response to a match of the wireless network ID and the predetermined ID and without exchange of information with the stationary device other than receipt of the pre-existing local wireless network ID.

8. The system of claim 7, wherein the pre-existing local wireless network signal comprises at least one of a Wi-Fi network, a Bluetooth network, an alarm network, and a home automation network.

9. The system of claim 7, further comprising a user input device configured to receive instructions from a user to perform at least one of: associating the wireless network ID with a movable barrier function to be performed, and implementing a learning mode to program the predetermined ID into the memory of the security code transmitter.

10. A method for commanding a barrier movement operator, the method comprising:
checking for a pre-existing local wireless network signal comprising the wireless network ID, the pre-existing wireless network signal being generated by a stationary device separate from the barrier movement operator;
detecting the pre-existing local wireless network signal comprising the wireless network ID;
determining whether a predetermined ID stored in a memory matches the wireless network ID of the pre-existing local wireless network signal; and
transmitting a control signal to a wireless receiver of the barrier movement operator in response to a successful match of the predetermined ID and the wireless network ID and without exchange of information with the stationary device other than receipt of the pre-existing local wireless network ID.

11. The method of claim 10, further comprising receiving instructions from a user input to perform at least one of: associating the wireless network ID with a movable barrier function to be performed, and implementing a learning mode to program the predetermined ID into the memory.

12. The method of claim 10, wherein determining whether the predetermined ID stored in the memory matches the wireless network ID of the pre-existing local wireless network signal comprises determining whether one of a plurality of predetermined IDs stored in the memory matches the wireless network ID of the pre-existing local wireless network signal.

13. The method of claim 10, wherein the control signal causes a movable barrier function to be performed comprising at least one of: opening the movable barrier, closing the movable barrier, turning on a light in communication with the barrier movement operator, turning off the light in communication with the barrier movement operator, and turning on an electrical load.

14. The method of claim 10, wherein checking for the pre-existing local wireless network signal comprises checking for the pre-existing local wireless network signal in response to no longer detecting the pre-existing local wireless network signal comprising the wireless network ID.

15. The method of claim 10, further comprising determining a strength of the pre-existing local wireless network signal, wherein the transmitting the control signal to the barrier movement operator is performed only in response determining that the strength of the pre-existing local wireless network signal exceeds a predetermined threshold strength.

16. A method of programming a security code transmitter to transmit a control signal to a barrier movement operator, the method comprising:
initiating a learning mode in response to a user input;
receiving a pre-existing local wireless network signal comprising a wireless network ID, the pre-existing local wireless network signal being generated by a stationary device separate from a barrier movement operator;
storing the wireless network ID in a memory of the security code transmitter; and configuring the security code transmitter to check for and detect the pre-existing local wireless network signal comprising the wireless network ID and transmit a control signal to a wireless receiver of the barrier movement operator in response to detecting the wireless network ID and without exchange of information with the stationary device other than receipt of the pre-existing local wireless network ID.

17. The method of claim 16, wherein the learning mode is initiated in response to receiving an input from an input device of the security code transmitter.

18. The method of claim 16, wherein the memory is adapted to store multiple different wireless network IDs.

19. The method of claim 16, further storing a function to be performed in response to detection of the wireless network ID in the memory based on a second user input.

20. A security code transmitter comprising:
a receiver configured to check for and detect a local Wi-Fi computer network signal comprising a service set identifier (SSID) without exchange of information with a transmitter of the local Wi-Fi computer network signal other than receipt of the local Wi-Fi computer network signal;
a memory configured to store a predetermined ID;
a transmitter; and
a processor configured to determine whether the SSID of the local Wi-Fi computer network signal matches the predetermined ID, and in response to determining a match, to control the transmitter to transmit a control signal to a wireless receiver of the barrier movement operator.

* * * * *

UNITED STATES PATENT AND TRADEMARK OFFICE
CERTIFICATE OF CORRECTION

PATENT NO. : 8,643,465 B2  
APPLICATION NO. : 11/566529  
DATED : February 4, 2014  
INVENTOR(S) : James J. Fitzgibbon Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1431 days.

Signed and Sealed this  
Twelfth Day of May, 2015

Michelle K. Lee  
*Director of the United States Patent and Trademark Office*